(12) United States Patent (10) Patent No.: US 8,400,068 B2
Terashima (45) Date of Patent: Mar. 19, 2013

(54) DISCHARGE LAMP LIGHTING DEVICE, PROJECTOR, AND DRIVING METHOD OF DISCHARGE LAMP

(75) Inventor: Tetsuo Terashima, Chino (JP)

(73) Assignee: Seiko Epson Corporation, Tokyo (JP)

( * ) Notice: Subject to any disclaimer, the term of this patent is extended or adjusted under 35 U.S.C. 154(b) by 371 days.

(21) Appl. No.: 12/832,157

(22) Filed: Jul. 8, 2010

(65) Prior Publication Data

US 2011/0012524 A1    Jan. 20, 2011

(30) Foreign Application Priority Data

Jul. 14, 2009 (JP) ................................ 2009-165355

(51) Int. Cl.
*H05B 41/36* (2006.01)
(52) U.S. Cl. ..................... 315/246; 315/307; 315/308
(58) Field of Classification Search .............. 315/209 R, 315/224, 246, 287, 307, 308
See application file for complete search history.

(56) References Cited

U.S. PATENT DOCUMENTS

| | | | |
|---|---|---|---|
| 4,912,374 A * | 3/1990 | Nagase et al. ................ | 315/244 |
| 7,023,144 B2 | 4/2006 | Suzuki et al. | |
| 7,170,237 B2 | 1/2007 | Suzuki et al. | |
| 2008/0116820 A1 * | 5/2008 | Ozasa et al. ................... | 315/246 |
| 2008/0297739 A1 * | 12/2008 | Yamauchi et al. .............. | 353/85 |
| 2010/0128232 A1 * | 5/2010 | Kagata et al. ................... | 353/85 |
| 2010/0194311 A1 * | 8/2010 | Terashima .................... | 315/307 |

FOREIGN PATENT DOCUMENTS

| | | |
|---|---|---|
| JP | 1-112698 A | 5/1989 |
| JP | 1-217893 A | 8/1989 |
| JP | 2003-059684 A | 2/2003 |
| JP | 2006-059790 A | 3/2006 |
| JP | 2006-332015 A | 12/2006 |

* cited by examiner

*Primary Examiner* — Douglas W Owens
*Assistant Examiner* — Amy Yang
(74) *Attorney, Agent, or Firm* — AdvantEdge Law Group, LLC

(57) ABSTRACT

In at least one embodiment of the disclosure, a discharge lamp lighting device comprises a discharge lamp driving section and a control unit. The control unit alternately performs a first DC driving processing and a first AC driving processing in a first portion of the driving current. The control unit alternately performs a second DC driving processing and a second AC driving processing in a second portion of the driving current different from the first portion. The control unit performs the first AC driving processing and the second AC driving processing such that a frequency of a first alternating current and a frequency of a second alternating current have different values.

18 Claims, 10 Drawing Sheets

FIRST POLARITY STATE P1

SECOND POLARITY STATE P2

DISCHARGE LAMP LIGHTING DEVICE, PROJECTOR, AND DRIVING METHOD OF DISCHARGE LAMP

CROSS-REFERENCE

The present application claims priority from Japanese Patent Application No. 2009-165355 filed on Jul. 14, 2009 which is hereby incorporated by reference in its entirety.

BACKGROUND

Discharge lamps, such as high-pressure mercury lamps or metal halide lamps, have been used as light sources of a projector. In these discharge lamps, the shape of an electrode changes due to a drop in fusibility resulting from consumption of the electrode by discharge or progress of crystallization of the electrode according to an increase in cumulative lighting time. In addition, when a plurality of projections grow in an electrode tip portion or irregular consumption of the electrode body progresses by those described above, the arc origin moves or the arc length changes. Such phenomena are not desirable because they reduce the brightness of a discharge lamp so that the lifespan of the discharge lamp is reduced.

In order to solve the problem, a discharge lamp lighting device that drives a discharge lamp using alternating currents with different frequencies is known (see, e.g., JP-A-2006-59790). In addition, a discharge lamp lighting device that supplies a driving current, in which a direct current is intermittently inserted in a high-frequency alternating current, to a discharge lamp is known (see, e.g., JP-A-1-112698).

However, if the thermal conditions (easiness of temperature increase or temperature decrease) of electrodes provided in a discharge lamp are different for every electrode, the degree of growth or melting of a projection of an electrode tip portion which becomes an arc origin changes with an electrode. For this reason, particular consideration is required in order to maintain the shape of the projection of the electrode tip portion. For example, a projection of an electrode tip portion under the condition where the temperature thereof is likely to rise may disappear. If the projection of the electrode tip portion disappears, the arc origin becomes unstable or it becomes a cause of further deformation of the electrode. Moreover, an electrode material evaporates excessively from the electrode tip portion which is under the condition where the temperature is likely to rise. As a result, blackening, which occurs by adhesion of the evaporated electrode material to the sealed body, and formation of needle-like crystals may progress more easily.

SUMMARY

Various embodiments of the disclosure provide a discharge lamp lighting device capable of suppressing the deformation of an electrode of a discharge lamp, a projector, and a driving method of a discharge lamp.

According to an aspect of the disclosure, there is provided a discharge lamp lighting device including: a discharge lamp driving section that supplies a driving current to a discharge lamp, which has a pair of electrodes with different thermal conditions, to drive the discharge lamp; and a control unit that controls the discharge lamp driving section. The control unit performs first DC driving processing and first AC driving processing alternately in a first section. The control unit performs second DC driving processing and second AC driving processing alternately in a second section different from the first section. The control unit performs control of supplying a first direct current, which starts from a first polarity and has a first polarity component, as the driving current in the first DC driving processing. The control unit performs control of supplying a first alternating current, which repeats a first polarity component and a second polarity component at a first frequency, as the driving current in the first AC driving processing. The control unit performs control of supplying a second direct current, which starts from a second polarity and has a second polarity component, as the driving current in the second DC driving processing. The control unit performs control of supplying a second alternating current, which repeats a first polarity component and a second polarity component at a second frequency, as the driving current in the second AC driving processing. The control unit performs the first AC driving processing and the second AC driving processing at the first and second frequencies of different values.

The first direct current may be a current pulse having a first polarity component multiple times, and the second direct current may be a current pulse having a second polarity component multiple times.

According to the discharge lamp lighting device, the first AC driving processing and the second AC driving processing are performed at the first and second frequencies of different values. As a result, since the deformation of the electrode of the discharge lamp is suppressed, it is possible to select a more suitable driving condition according to the thermal condition of each electrode provided in the discharge lamp.

According to another aspect of the disclosure, there is provided a discharge lamp lighting device including: a discharge lamp driving section that supplies a driving current to a discharge lamp, which has a pair of electrodes with different thermal conditions, to drive the discharge lamp; and a control unit that controls the discharge lamp driving section. The control unit performs first DC driving processing and first AC driving processing alternately in a first section. The control unit performs second DC driving processing and second AC driving processing alternately in a second section different from the first section. The control unit performs control of supplying a first direct current, which starts from a first polarity and has a first polarity component, as the driving current in the first DC driving processing. The control unit performs control of supplying a first alternating current, which repeats a first polarity component and a second polarity component at a first frequency, as the driving current in the first AC driving processing. The control unit performs control of supplying a second direct current, which starts from a second polarity and has a second polarity component, as the driving current in the second DC driving processing. The control unit performs control of supplying a second alternating current, which repeats a first polarity component and a second polarity component at a second frequency, as the driving current in the second AC driving processing. The control unit performs the first AC driving processing and the second AC driving processing by changing the first frequency in a first modulation pattern and changing the second frequency in a second modulation pattern different from the first modulation pattern.

According to the discharge lamp lighting device, the first AC driving processing and the second AC driving processing are performed by changing the first frequency in the first modulation pattern and changing the second frequency in the second modulation pattern different from the first modulation pattern. As a result, since the deformation of the electrode of the discharge lamp is suppressed, it is possible to select a more suitable driving condition according to the thermal condition of each electrode provided in the discharge lamp.

In the discharge lamp lighting device described above, the discharge lamp, which includes a first electrode that operates as an anode at the time of the first polarity and a second electrode that operates as an anode at the time of the second polarity and in which the thermal conditions where a temperature of the second electrode is likely to rise compared with that of the first electrode, may be driven.

In the discharge lamp lighting device described above, the control unit may perform the first AC driving processing and the second AC driving processing such that the maximum value of a temporal change of the second frequency in the second modulation pattern becomes smaller than that of the first frequency in the first modulation pattern.

According to the discharge lamp lighting device, the first AC driving processing and the second AC driving processing are performed such that the maximum value of a temporal change of the second frequency in the second modulation pattern becomes smaller than that of the first frequency in the first modulation pattern. As a result, it is possible to suppress problems, such as blackening, caused by excessive evaporation, scattering, or the like of an electrode material which easily occurs in the second electrode, the temperature of which is likely to rise.

In the discharge lamp lighting device described above, the control unit may perform the first AC driving processing and the second AC driving processing such that the second frequency becomes higher than the first frequency.

According to the discharge lamp lighting device, the first AC driving processing and the second AC driving processing are performed such that the second frequency becomes higher than the first frequency. Accordingly, it is possible to suppress the loss of a projection of an electrode tip portion serving as an arc origin, which is caused by excessive melting, in the second electrode, the temperature of which is likely to rise.

In the discharge lamp lighting device described above, the discharge lamp in which a main reflecting mirror, which reflects a light beam generated by discharge between the first and second electrodes so that the light beam is emitted to an illuminated region, is disposed at the first electrode side and an auxiliary reflecting mirror, which reflects a light beam from an interelectrode space between the first and second electrodes toward the interelectrode space side, is disposed at the second electrode side so as to face the main reflecting mirror may be driven.

In the discharge lamp lighting device described above, the control unit may perform the first AC driving processing and the second AC driving processing such that the length of a period, for which the first AC driving processing is performed, in the first section is different from the length of a period, for which the second AC driving processing is performed, in the second section.

According to the discharge lamp lighting device, the first AC driving processing and the second AC driving processing are performed such that the length of a period, for which the first AC driving processing is performed, in the first section is different from the length of a period, for which the second AC driving processing is performed, in the second section. Accordingly, the frequency of the first DC driving processing in which the temperature of one electrode (first electrode) rises and the frequency of the second DC driving processing in which the temperature of the other electrode (second electrode) rises can be selected according to the thermal condition of each electrode. As a result, a more suitable driving condition can be selected in order to suppress the deformation of the electrode of the discharge lamp.

In the discharge lamp lighting device described above, the control unit may perform the first DC driving processing and the second DC driving processing such that the length of a period, for which the first DC driving processing is performed, in the first section is different from the length of a period, for which the second DC driving processing is performed, in the second section.

According to the discharge lamp lighting device, the first DC driving processing and the second DC driving processing are performed such that the length of a period, for which the first DC driving processing is performed, in the first section is different from the length of a period, for which the second DC driving processing is performed, in the second section. Accordingly, the length of the period of the first DC driving processing in which the temperature of one electrode (first electrode) rises and the length of the period of the second DC driving processing in which the temperature of the other electrode (second electrode) rises can be selected according to the thermal condition of each electrode. As a result, a more suitable driving condition can be selected in order to suppress the deformation of the electrode of the discharge lamp.

According to still another aspect of the disclosure, there is provided a projector including one of the discharge lamp lighting devices described above.

According to the projector, in order to suppress the deformation of the electrode of the discharge lamp, it is possible to select a more suitable driving condition according to the thermal condition of each electrode provided in the discharge lamp.

According to yet another aspect of the disclosure, there is provided a driving method of a discharge lamp that lights through supply of a driving current to a discharge lamp having a pair of electrodes with different thermal conditions including: performing first DC driving and first AC driving alternately in a first section; performing second DC driving and second AC driving alternately in a second section different from the first section; supplying a first direct current, which starts from a first polarity and has a first polarity component, as the driving current in the first DC driving; supplying a first alternating current, which repeats a first polarity component and a second polarity component at a first frequency, as the driving current in the first AC driving; supplying a second direct current, which starts from a second polarity and has a second polarity component, as the driving current in the second DC driving; supplying a second alternating current, which repeats a first polarity component and a second polarity component at a second frequency, as the driving current in the second AC driving; and performing the first AC driving and the second AC driving at the first and second frequencies of different values.

According to the driving method of a discharge lamp, the first AC driving and the second AC driving are performed at the first and second frequencies of different values. Accordingly, since the deformation of the electrode of the discharge lamp is suppressed, it is possible to select a more suitable driving condition according to the thermal condition of each electrode provided in the discharge lamp.

According to still yet another aspect of the disclosure, a driving method of a discharge lamp that lights through supply of a driving current to a discharge lamp having a pair of electrodes with different thermal conditions includes: performing first DC driving and first AC driving alternately in a first section; performing second DC driving and second AC driving alternately in a second section different from the first section; supplying a first direct current, which starts from a first polarity and has a first polarity component, as the driving current in the first DC driving; supplying a first alternating current, which repeats a first polarity component and a second polarity component at a first frequency, as the driving current in the first AC driving; supplying a second direct current, which starts from a second polarity and has a second polarity component, as the driving current in the second DC driving; supplying a second alternating current, which repeats a first polarity component and a second polarity component at a second frequency, as the driving current in the second AC driving; and performing the first AC driving processing and the second AC driving processing by changing the first frequency in a first modulation pattern and changing the second frequency in a second modulation pattern different from the first modulation pattern.

According to the driving method of the discharge lamp, the first AC driving and the second AC driving are performed by changing the first frequency in the first modulation pattern and changing the second frequency in the second modulation pattern different from the first modulation pattern. Accordingly, since the deformation of the electrode of the discharge lamp is suppressed, it is possible to select a more suitable driving condition according to the thermal condition of each electrode provided in the discharge lamp.

BRIEF DESCRIPTION OF THE DRAWINGS

Non-limiting and non-exhaustive embodiments of the present disclosure will be described with reference to the accompanying drawings, wherein like numbers reference like elements.

DESCRIPTION OF EMBODIMENTS

In the following description, reference is made to the accompanying drawings which form a part hereof, and in which are shown, by way of illustration, specific embodiments in which the disclosure may be practiced. It is to be understood that other embodiments may be utilized and changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

1. Optical System of a Projector

Figure 1:
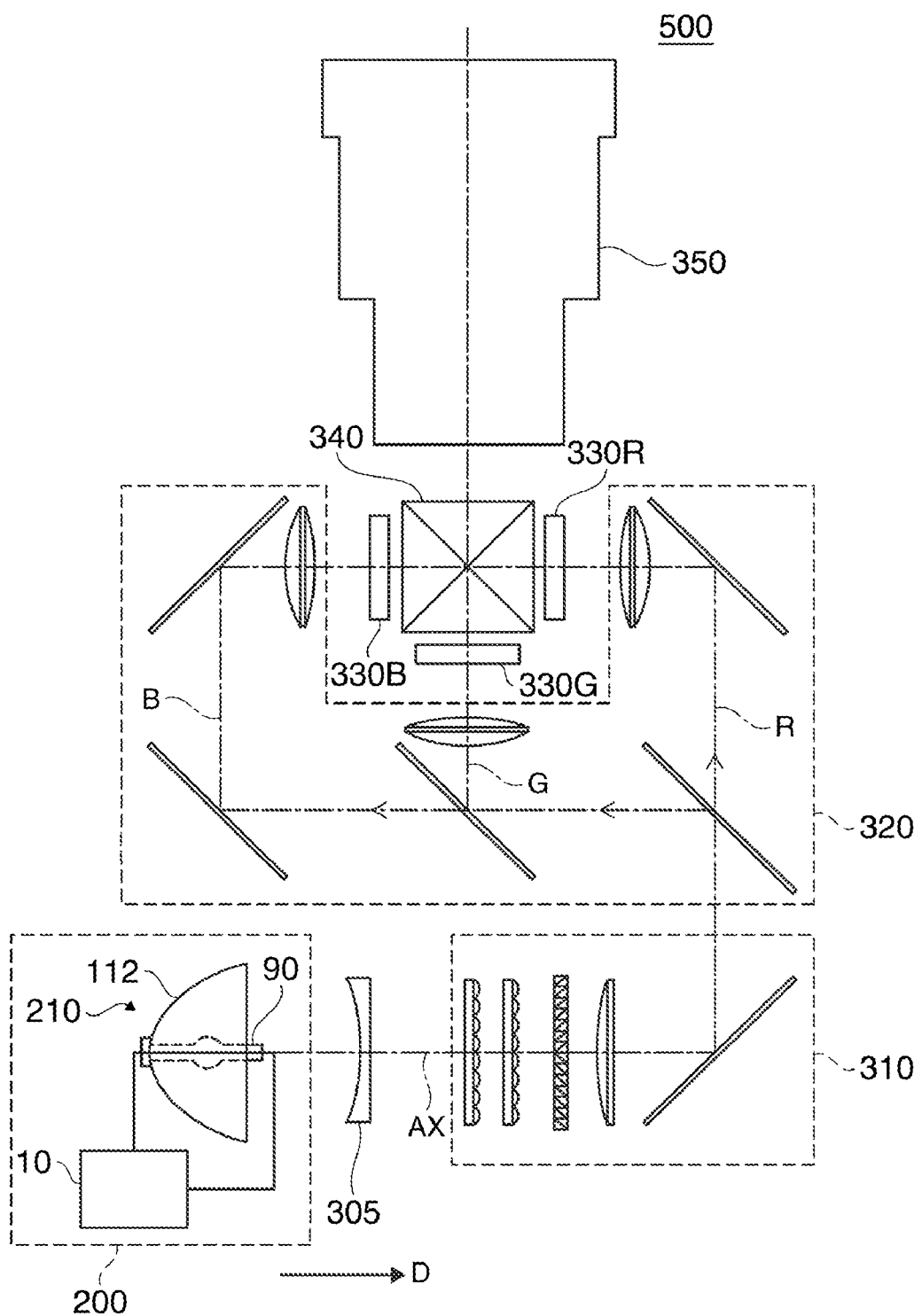
FIG. 1 is an explanatory view illustrating the configuration of a projector as an embodiment of the disclosure.

FIG. 1 is an explanatory view showing the configuration of a projector 500 as an embodiment of the disclosure. The projector 500 includes a light source device 200, a collimating lens 305, an illumination optical system 310, a color separation optical system 320, three liquid crystal light valves 330R, 330G, and 330B, a cross dichroic prism 340, and a projection optical system 350.

The light source device 200 has a light source unit 210 and a discharge lamp lighting device 10. The light source unit 210 has a main reflecting mirror 112, an auxiliary reflecting mirror 50 (FIG. 2), and a discharge lamp 90. The discharge lamp lighting device 10 supplies electric power to the discharge lamp 90 so that the discharge lamp 90 lights. The main reflecting mirror 112 reflects the light emitted from the discharge lamp 90 toward the irradiation direction D. The irradiation direction D is parallel to the optical axis AX. The light from the light source unit 210 passes through the collimating lens 305 and is then incident on the illumination optical system 310. The collimating lens 305 collimates the light from the light source unit 210.

The illumination optical system 310 equalizes the illuminance of the light from the light source device 200 in the liquid crystal light valves 330R, 330G, and 330B. In addition, the illumination optical system 310 aligns the polarization direction of the light from the light source device 200 in one direction. The reason is to use the light from the light source device 200 effectively in the liquid crystal light valves 330R, 330G, and 330B. The light whose illuminance distribution and polarization direction have been adjusted is incident on the color separation optical system 320. The color separation optical system 320 separates the incident light into three color light components of red (R), green (G), and blue (B). The three color light components are modulated by the liquid crystal light valves 330R, 330G, and 330B corresponding to the colors, respectively. The liquid crystal light valves 330R, 330G, and 330B include liquid crystal panels 560R, 560G, and 560B and polarizers disposed at the light incidence and emission sides of the liquid crystal panels 560R, 560G, and 560B, respectively. The three modulated color light components are mixed by the cross dichroic prism 340. The mixed light is incident on the projection optical system 350. The projection optical system 350 projects the incident light onto a screen (not shown). As a result, an image is displayed on the screen.

In addition, various known configurations may be adopted as the configurations of the collimating lens 305, the illumination optical system 310, the color separation optical system 320, the cross dichroic prism 340, and the projection optical system 350.

Figure 2:
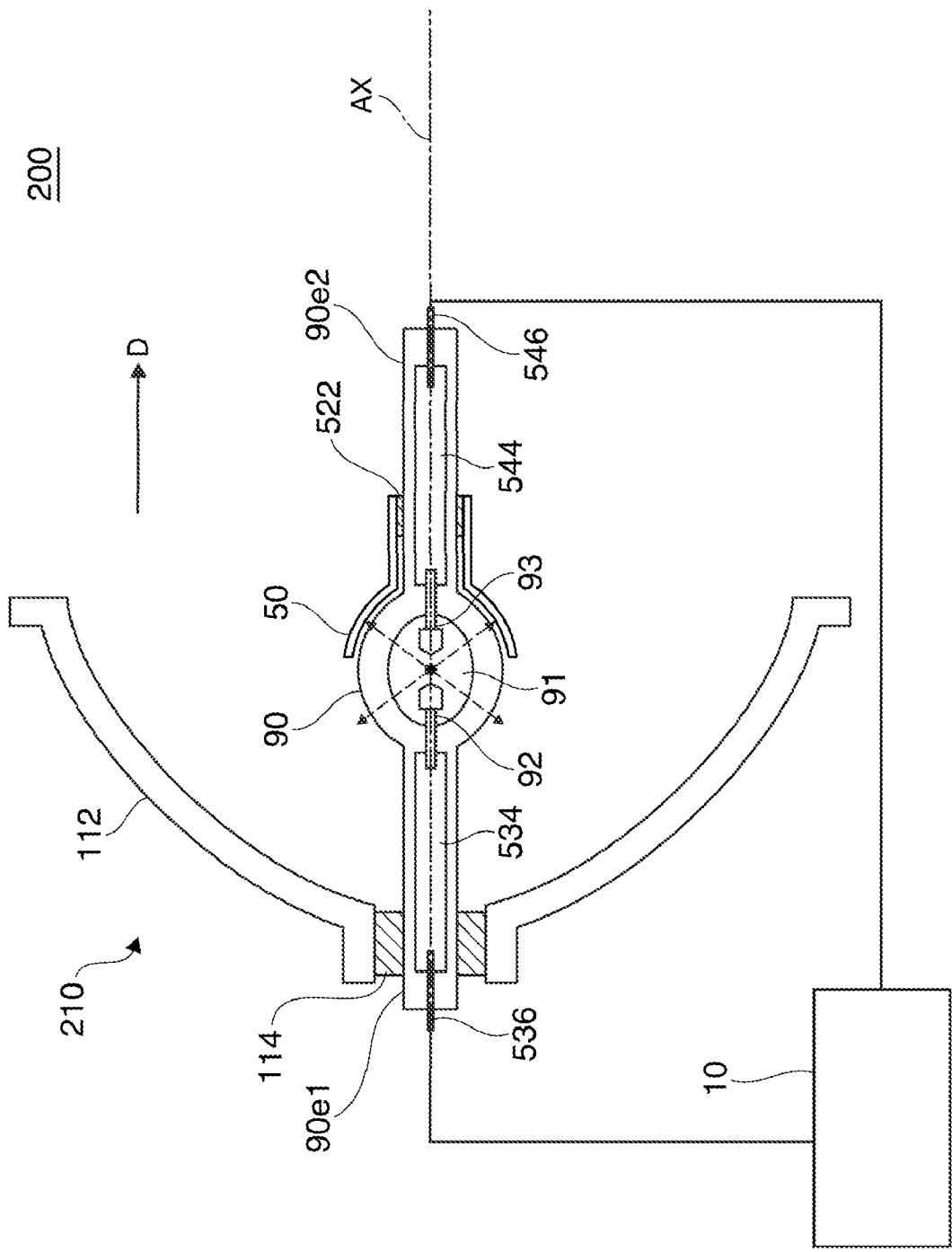
FIG. 2 is an explanatory view illustrating the configuration of a light source device.

FIG. 2 is an explanatory view showing the configuration of the light source device 200. The light source device 200 has the light source unit 210 and the discharge lamp lighting device 10. In FIG. 2, a sectional view of the light source unit 210 is shown. The light source unit 210 has the main reflecting mirror 112, the discharge lamp 90, and the auxiliary reflecting mirror 50.

The discharge lamp 90 has a rod shape which extends from a first end 90e1 to a second end 90e2 along the irradiation direction D. A material of the discharge lamp 90 is a translucent material, such as quartz glass. A middle portion of the discharge lamp 90 expands in a spherical shape, and a discharge space 91 is formed therein. Rare gas and gas, which is a discharge medium containing a metal halogen compound and the like, are injected into the discharge space 91.

Moreover, in the discharge space 91, two electrodes 92 and 93 protrude from the discharge lamp 90. The first electrode 92 is disposed at the first end 90e1 side of the discharge space 91, and the second electrode 93 is disposed at the second end 90e2 side of the discharge space 91. Each of the electrodes 92 and 93 has a rod shape extending along at the optical axis AX. In the discharge space 91, tip portions (also called 'discharge ends') of the electrodes 92 and 93 face each other with a predetermined distance therebetween. In addition, the material of each of the electrodes 92 and 93 is metal, such as tungsten.

A first terminal 536 is provided at the first end 90e1 of the discharge lamp 90. The first terminal 536 and the first electrode 92 are electrically connected to each other by a conductive member 534 passing through the inside of the discharge lamp 90. Similarly, the second terminal 546 is provided at the second end 90e2 of the discharge lamp 90. The second terminal 546 and the second electrode 93 are electrically connected to each other by a conductive member 544 passing through the inside of the discharge lamp 90. The material of each of the terminals 536 and 546 is metal, such as tungsten. Moreover, for example, a molybdenum foil is used for the conductive members 534 and 544.

The terminals 536 and 546 are connected to the discharge lamp lighting device 10. The discharge lamp lighting device 10 supplies an alternate current to the terminals 536 and 546. As a result, arc discharge occurs between the two electrodes 92 and 93. The light (discharge light) generated by the arc discharge is emitted in all directions from the discharge position, as indicated by dotted arrows.

The main reflecting mirror 112 is fixed to the first end 90e1 of the discharge lamp 90 by a fixing member 114. The reflecting surface (surface facing the discharge lamp 90) of the main reflecting mirror 112 has a spheroidal shape. The main reflecting mirror 112 reflects the discharge light toward the irradiation direction D. In addition, the shape of the reflecting surface of the main reflecting mirror 112 is not limited to the spheroidal shape, and various shapes allowing the discharge light to be reflected toward the irradiation direction D may also be adopted. For example, the shape of paraboloid of revolution may be adopted. In this case, the main reflecting mirror 112 can convert the discharge light into light which is almost parallel to the optical axis AX. Accordingly, the collimating lens 305 may not be provided.

The auxiliary reflecting mirror 50 is fixed to the second end 90e2 side of the discharge lamp 90 by a fixing member 522. The reflecting surface (surface facing the discharge lamp 90) of the auxiliary reflecting mirror 50 has a spherical shape surrounding the second end 90e2 side of the discharge space 91. The auxiliary reflecting mirror 50 reflects the discharge light toward the main reflecting mirror 112. Thus, the use efficiency of the light emitted from the discharge space 91 can be improved.

In addition, as the material of the fixing members 114 and 522, an arbitrary heat-resistant material (for example, an inorganic adhesive) which can stand the heat generation of the discharge lamp 90 may be adopted. In addition, the method of fixing the arrangement of the main reflecting mirror 112, the auxiliary reflecting mirror 50, and the discharge lamp 90 is not limited to the method of fixing the main reflecting mirror 112 and the auxiliary reflecting mirror 50 to the discharge lamp 90, and an arbitrary method may be adopted. For example, the discharge lamp 90 and the main reflecting mirror 112 may be fixed independently in a housing (not shown) of a projector. The same is true for the auxiliary reflecting mirror 50.

Figure 3:
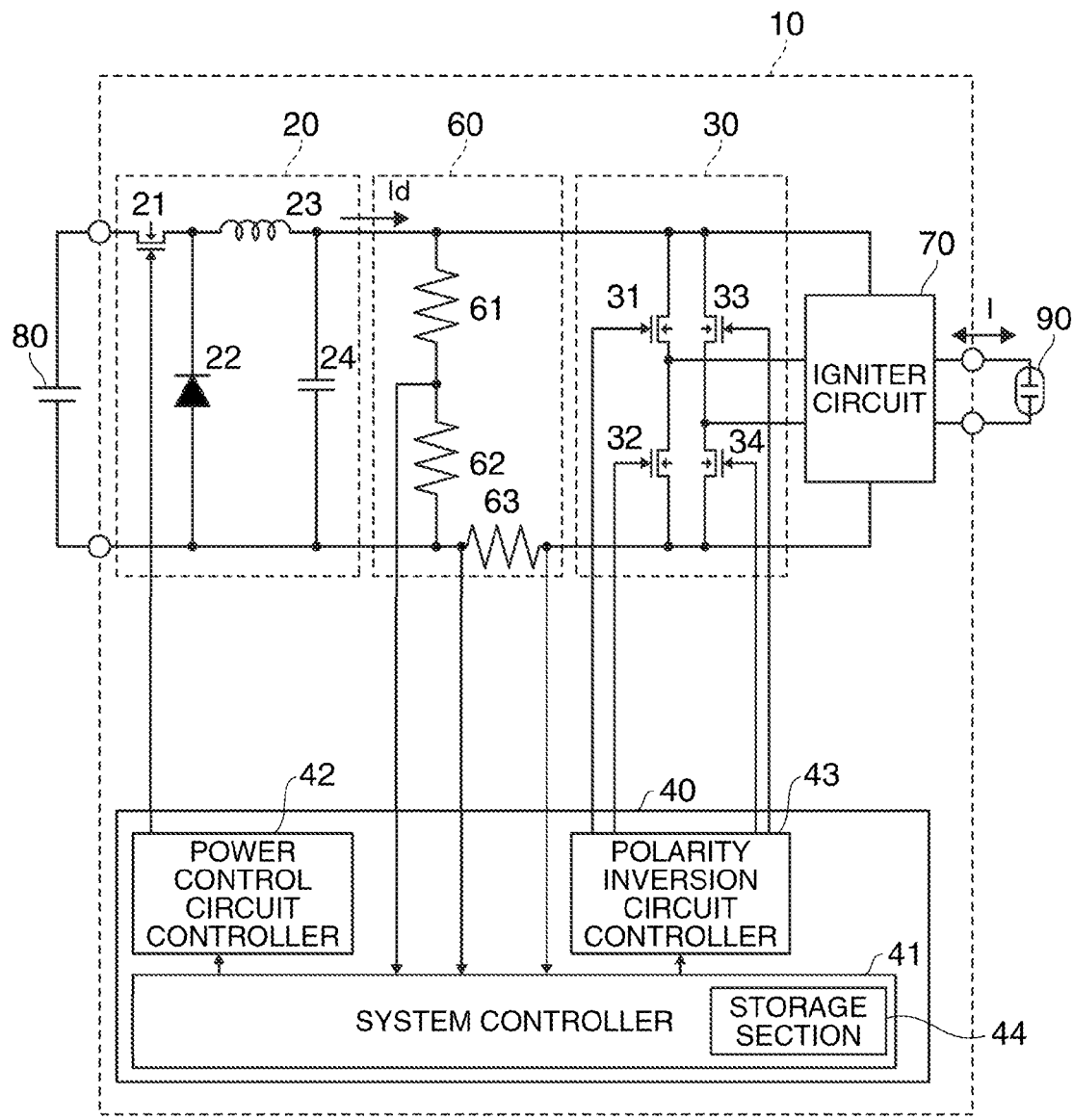
FIG. 3 illustrates an example of a circuit diagram of a discharge lamp lighting device according to an embodiment.

2. Discharge Lamp Lighting Device According to the First Embodiment (1) Configuration of a Discharge Lamp Lighting Device FIG. 3 shows an example of the circuit diagram of the discharge lamp lighting device according to the present embodiment.

The discharge lamp lighting device 10 includes a power control circuit 20. The power control circuit 20 generates driving electric power supplied to the discharge lamp 90. In the present embodiment, the power control circuit 20 is formed as a down chopper circuit to which power from a DC power supply 80 is input and from which a direct current Id is output after dropping the input voltage.

The power control circuit 20 may be configured to include a switching element 21, a diode 22, a coil 23, and a condenser 24. The switching element 21 may be formed by a transistor, for example. In the present embodiment, one end of the switching element 21 is connected to a positive voltage side of the DC power supply 80, and the other end is connected to a cathode terminal of the diode 22 and one end of the coil 23. In addition, one end of the condenser 24 is connected to the other end of the coil 23, and the other end of the condenser 24 is connected to an anode terminal of the diode 22 and a negative voltage side of the DC power supply 80. A current control signal from a control unit 40 is input to a control terminal of the switching element 21 so that ON/OFF of the switching element 21 is controlled. For example, a PWM (Pulse Width Modulation) control signal may be used as the current control signal.

Here, when the switching element 21 is turned ON, a current flows through the coil 23 so that the energy is stored in the coil 23. Then, when the switching element 21 is turned OFF, the energy stored in the coil 23 is discharged in a path passing through the condenser 24 and the diode 22. As a result, the direct current Id corresponding to the rate of time for which the switching element 21 is in the ON state is generated.

The discharge lamp lighting device 10 includes a polarity inversion circuit 30. The direct current Id output from the power control circuit 20 is input to the polarity inversion circuit 30. Then, the polarity inversion circuit 30 inverts the polarity of the direct current Id at a predetermined timing to thereby generate and output a driving current I that is a direct current, which continues for a controlled period, or that is an alternating current with an arbitrary frequency. In the present embodiment, the polarity inversion circuit 30 is formed by an inverter bridge circuit (full bridge circuit).

For example, the polarity inversion circuit 30 is configured to include first to fourth switching elements 31 to 34, such as transistors. That is, the polarity inversion circuit 30 is formed by connecting the first and second switching elements 31 and 32, which are connected in series, in parallel to the third and fourth switching elements 33 and 34 connected in series. A polarity inversion control signal from the control unit 40 is input to control terminals of the first to fourth switching elements 31 to 34 so that ON/OFF of the first to fourth switching elements 31 to 34 is controlled.

The polarity inversion circuit 30 alternately inverts the polarity of the direct current Id output from the power control circuit 20 by alternately repeating ON/OFF of the first and fourth switching elements 31 and 34 and the second and third switching elements 32 and 33 and generates and outputs the driving current I that is a direct current, which continues for a controlled period, or that is an alternating current, which has an arbitrary frequency, from a common connection point of the first and second switching elements 31 and 32 and a common connection point of the third and fourth switching elements 33 and 34.

That is, the polarity inversion circuit 30 performs control such that the second and third switching elements 32 and 33 are turned OFF when the first and fourth switching elements 31 and 34 are turned ON and the second and third switching elements 32 and 33 are turned ON when the first and fourth switching elements 31 and 34 are turned OFF. Accordingly, when the first and fourth switching elements 31 and 34 are turned ON, the driving current I which flows from one end of the condenser 24 through the first switching element 31, the discharge lamp 90, and the fourth switching element 34 in this order is generated. In addition, when the second and third switching elements 32 and 33 are turned ON, the driving current I which flows from one end of the condenser 24 through the third switching element 33, the discharge lamp 90, and the second switching element 32 in this order is generated.

In the present embodiment, a combination of the power control circuit 20 and the polarity inversion circuit 30 corresponds to a discharge lamp driving section.

The discharge lamp lighting device 10 includes the control unit 40. The control unit 40 controls a holding time of the driving current I for which the same polarity continues and a current value, a frequency, and the like of the driving current I by controlling the power control circuit 20 and the polarity inversion circuit 30. The control unit 40 performs polarity inversion control for the polarity inversion circuit 30 at the polarity inversion timing of the driving current I in order to control a holding time of the driving current I for which the same polarity continues and a frequency and the like of the driving current I. In addition, the control unit 40 performs current control for the power control circuit 20 in order to control the current value of the output direct current Id.

The configuration of the control unit 40 is not particularly limited. In the present embodiment, the control unit 40 is configured to include a system controller 41, a power control circuit controller 42, and a polarity inversion circuit controller 43. In addition, a part or the entire control unit 40 may be formed by a semiconductor integrated circuit.

A system controller 41 controls the power control circuit 20 and the polarity inversion circuit 30 by controlling the power control circuit controller 42 and the polarity inversion circuit controller 43. The system controller 41 may control the power control circuit controller 42 and the polarity inversion circuit controller 43 on the basis of the driving current I and a driving voltage Vla detected by an operation detecting section 60 provided in the discharge lamp lighting device 10, which will be described later.

In the present embodiment, the system controller 41 is configured to include a storage section 44. In addition, the storage section 44 may be provided separately from the system controller 41.

The system controller 41 may control the power control circuit 20 and the polarity inversion circuit 30 on the basis of the information stored in the storage section 44. For example, the information regarding driving parameters, such as a holding time of the driving current I for which the same polarity continues, a current value, a frequency, a waveform, and a modulation pattern of the driving current I, may be stored in the storage section 44.

The power control circuit controller 42 controls the power control circuit 20 by outputting a current control signal to the power control circuit 20 on the basis of the control signal from the system controller 41.

The polarity inversion circuit controller 43 controls the polarity inversion circuit 30 by outputting a polarity inversion control signal to the polarity inversion circuit 30 on the basis of the control signal from the system controller 41.

Figure 4:
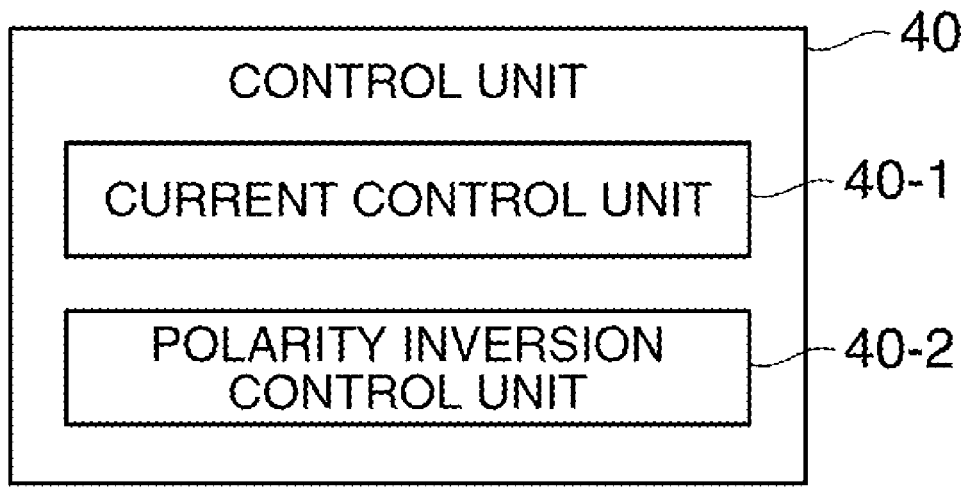
FIG. 4 is a view for explaining the configuration of a control unit in the present embodiment.

In addition, the control unit 40 may be realized by a dedicated circuit so that various kinds of control of the above-described processing or processing to be described later are performed. For example, the control unit 40 may be made to function as a computer by executing a control program stored in the storage section 44 by means of a CPU (Central Processing Unit), such that various kinds of control of the processing are performed. That is, as shown in FIG. 4, the control unit 40 may be made to function as a current control unit 40-1, which is configured to control the power control circuit 20, and a polarity inversion control unit 40-2, which is configured to control the polarity inversion circuit 30, by a control program.

The discharge lamp lighting device 10 may also include the operation detecting unit 60. The operation detecting unit 60 may include a voltage detecting section, which detects the driving voltage Vla of the discharge lamp 90 and outputs the driving voltage information, or a current detecting section which detects the driving current I and outputs the driving current information, for example. In the present embodiment, the operation detecting unit 60 is configured to include first to third resistors 61 to 63.

In the present embodiment, the voltage detecting section detects the driving voltage Vla using a voltage divided by the first and second resistors 61 and 62, which are connected in series to each other and which are connected in parallel to the discharge lamp 90. Moreover, in the present embodiment, the current detecting section detects the driving current I using a voltage generated in a third resistor 63 connected in series to the discharge lamp 90.

The discharge lamp lighting device 10 may include an igniter circuit 70. The igniter circuit 70 operates only at the start of lighting of the discharge lamp 90 and applies a high voltage (voltage which is higher than the voltage at the time of normal lighting of the discharge lamp 90), which is required to form a discharge path by dielectric breakdown between electrodes of the discharge lamp 90 at the start of lighting of the discharge lamp 90, between the electrodes of the discharge lamp 90. In the present embodiment, the igniter circuit 70 is connected in parallel to the discharge lamp 90.

Figure 5A:
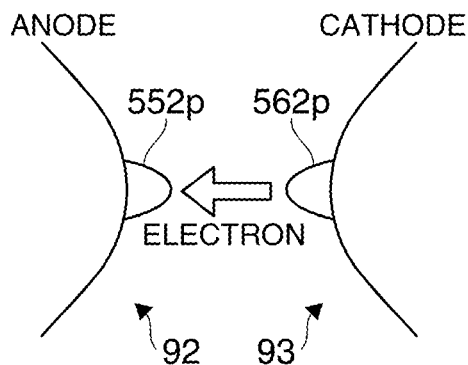
FIGS. 5A to 5D are explanatory views illustrating the relationship between the polarity of a driving current supplied to a discharge lamp and the temperature of an electrode.
Figure 5B:
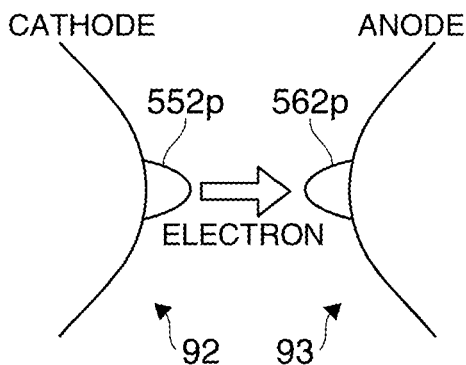

FIGS. 5A to 5D are explanatory views showing the relationship between the polarity of a driving current supplied to the discharge lamp 90 and the temperature of an electrode. FIGS. 5A and 5B show the operation state of the two electrodes 92 and 93. In FIGS. 5A and 5B, tip portions of the two electrodes 92 and 93 are shown. Projections 552*p* and 562*p* are provided on the tips of the electrodes 92 and 93, respectively. Discharge occurs between the projections 552*p* and 562*p*. In the present embodiment, the movement of the discharge position (arc position) in each of the electrodes 92 and 93 can be suppressed compared with the case where there is no projection. However, such projections may not be provided.

FIG. 5A shows a first polarity state P1 where the first electrode 92 operates as an anode and the second electrode 93 operates as a cathode. In the first polarity state P1, an electron moves from the second electrode 93 (cathode) to the first electrode 92 (anode) by discharge. An electron is emitted from the cathode (second electrode 93). The electron emitted from the cathode (second electrode 93) collides with the tip of the anode (first electrode 92). Heat is generated by the collision, and the temperature of the tip (projection 552*p*) of the anode (first electrode 92) rises.

FIG. 5B shows a second polarity state P2 where the first electrode 92 operates as a cathode and the second electrode 93 operates as an anode. In the second polarity state P2, an electron moves from the first electrode 92 to the second electrode 93 contrary to the first polarity state P1. As a result, the temperature of the tip (projection 562*p*) of the second electrode 93 rises.

Thus, the temperature of the anode is likely to rise compared with the cathode. Here, keeping a state where the temperature of one electrode is higher than that of the other electrode may cause various problems. For example, when the tip of a high-temperature electrode melts excessively, unintended electrode deformation may occur. As a result, the arc length may deviate from the appropriate value. In addition, when the tip of a low-temperature electrode melts insufficiently, fine uneven parts generated on the tip may remain without melting away. As a result, so-called arc jump may occur (arc position is not stabilized and moves).

Figure 5C:
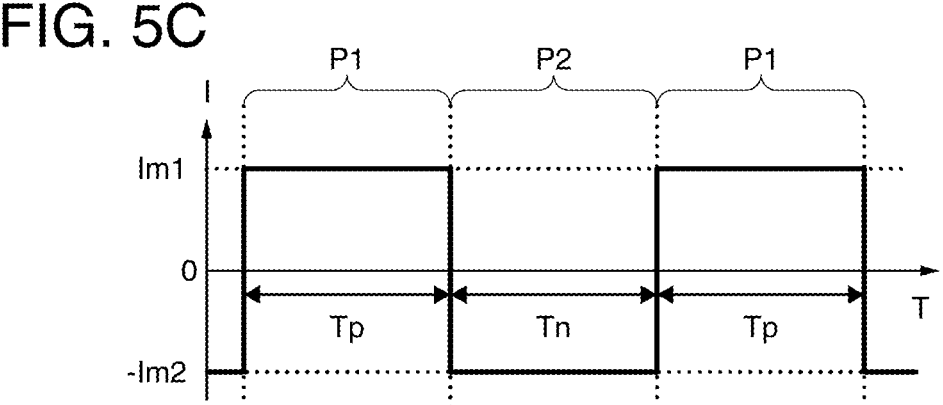

As a technique of suppressing such a problem, AC driving for changing the polarity of each electrode repeatedly may be used. FIG. 5C is a timing chart showing an example of the driving current I supplied to the discharge lamp 90 (FIG. 2). The horizontal axis indicates a time T, and the vertical axis indicates the current value of the driving current I. The driving current I indicates a current flowing through the discharge lamp 90. The positive value indicates the first polarity state P1, and the negative value indicates the second polarity state P2. In the example shown in FIG. 5C, a rectangular wave alternating current is used. In addition, the first and second polarity states P1 and P2 are repeated alternately. Here, a first polarity section Tp indicates a time for which the first polarity state P1 continues, and a second polarity section Tn indicates a time for which the second polarity state P2 continues. In addition, the average current value of the first polarity section Tp is Im1, and the average current value of the second polarity section Tn is −Im2. In addition, a frequency of the driving current I suitable for the driving of the discharge lamp 90 may be experimentally determined according to the characteristic of the discharge lamp 90 (for example, the value in a range of 30 Hz to 1 kHz is adopted). Similarly, the other values Im1, −Im2, Tp, and Tn may also be determined experimentally.

Figure 5D:
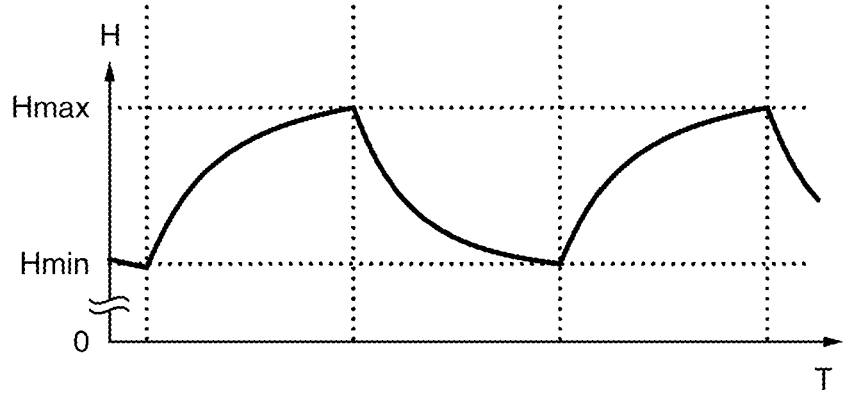

FIG. 5D is a timing chart showing a change in the temperature of the first electrode 92. The horizontal axis indicates a time T, and the vertical axis indicates a temperature H. The temperature H of the first electrode 92 rises in the first polarity state P1 and drops in the second polarity state P2. In addition, since the first and second polarity states P1 and P2 are repeated, the temperature H changes periodically between the minimum value Hmin and the maximum value Hmax. In addition, although not shown, the temperature of the second electrode 93 changes in an opposite phase to the temperature H of the first electrode 92. That is, the temperature of the second electrode 93 drops in the first polarity state P1 and rises in the second polarity state P2.

Since the tip of the first electrode 92 (projection 552*p*) melts in the first polarity state P1, the tip of the first electrode 92 (projection 552*p*) becomes smooth. As a result, the movement of the discharge position in the first electrode 92 can be suppressed. In addition, since the temperature of the tip of the second electrode (projection 562*p*) drops, the excessive melting of the second electrode 93 (projection 562*p*) is suppressed. As a result, unintended electrode deformation can be suppressed. In the second polarity state P2, the states of the first and second electrodes 92 and 93 are opposite. Accordingly, a problem in each of the two electrodes 92 and 93 can be suppressed by repeating the two states P1 and P2.

Here, if the waveform of the current I is symmetrical, that is, if the waveform of the current I satisfies the conditions of "|Im1|=|−Im2|, Tp=Tn", the conditions of the electric power supplied between the two electrodes 92 and 93 are the same. Accordingly, if the thermal conditions (easiness of increase or decrease in temperature) of the two electrodes 92 and 93 are the same, it is presumed that the temperature difference between the two electrodes 92 and 93 decreases. However, if the thermal conditions of the two electrodes 92 and 93 are different, a projection of an electrode tip portion under the condition where the temperature thereof is likely to rise, may disappear. If the projection of the electrode tip portion disappears, the arc origin becomes unstable or it becomes a cause of further deformation of the electrode. In addition, an electrode material evaporates excessively from the electrode tip portion which is under the condition where the temperature is likely to rise. As a result, blackening, which occurs by adhesion of the evaporated electrode material to the sealed body, and formation of needle-like crystals progress more easily.

In addition, if an electrode is too heated over a wide range (if arc spot (i.e. hot spot on the electrode surface generated by arc discharge) becomes large), the shape of the electrode deforms through excessive fusion. On the contrary, if the electrode is too cold (arc spot is small), the tip of the electrode cannot melt sufficiently. As a result, the tip cannot be returned smoothly. That is, the tip of the electrode easily deforms. Accordingly, if a uniform energy supply state continues for the electrode, the tip (projections 552*p* and 562*p*) of the electrode easily deforms to the unintended shape.

(2) Example Regarding the Control of a Discharge Lamp Lighting Device

Next, a specific example regarding the control of the discharge lamp lighting device 10 according to the first embodiment will be described.

The control unit 40 of the discharge lamp lighting device 10 according to the first embodiment performs first DC driving processing D1 (first DC driving) and first AC driving processing A1 (first AC driving) alternately in a first section, and performs second DC driving processing D2 (second DC driving) and second AC driving processing A2 (second AC driving) alternately in a second section different from the first section.

Figure 6A:
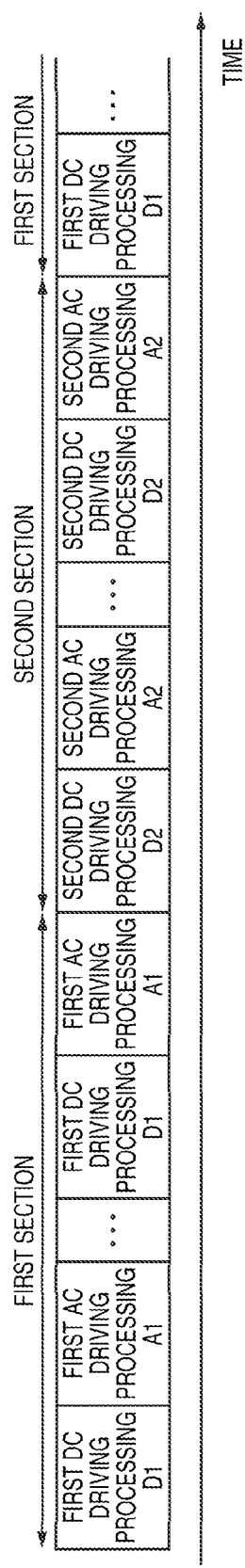
FIGS. 6A and 6B are views for explaining first and second sections.
Figure 6B:
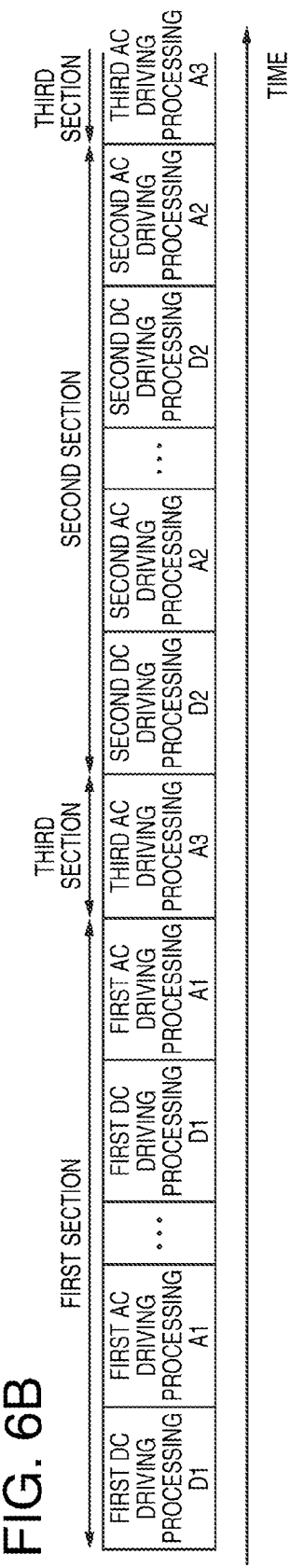

FIGS. 6A and 6B are views for explaining the first and second sections.

In the example shown in FIG. 6A, the control unit 40 controls a discharge lamp driving section such that the first section, in which the first DC driving processing D1 and the first AC driving processing A1 are alternately performed, and the second section, in which the second DC driving processing D2 and the second AC driving processing A2 are alternately performed, appear alternately.

Moreover, in the example shown in FIG. 6A, in the first section, the first DC driving processing D1 and the first AC driving processing A1 are alternately performed such that it starts in the first DC driving processing D1 and ends in the first AC driving processing A1. Moreover, in the second section, the second DC driving processing D2 and the second AC driving processing A2 are alternately performed such that it starts in the second DC driving processing D2 and ends in the second AC driving processing A2.

In addition, the control unit 40 may control the discharge lamp driving section such that a third section different from the first and second sections appears. For example, in the example shown in FIG. 6B, the control unit 40 controls the discharge lamp driving section such that a third section, in which third AC driving processing A3 is performed, appears between the first and second sections.

The control unit 40 performs control of supplying a first direct current, which starts from the first polarity and has a first polarity component, as the driving current I in the first DC driving processing D1 and performs control of supplying a first alternating current, which repeats a first polarity component and a second polarity component at a first frequency, as the driving current I in the first AC driving processing A1.

The control unit 40 performs control of supplying a second direct current, which starts from the second polarity and has a second polarity component, as the driving current I in the second DC driving processing D2 and performs control of supplying a second alternating current, which repeats a first polarity component and a second polarity component at a second frequency, as the driving current I in the second AC driving processing A2.

The control unit 40 performs the first AC driving processing A1 and the second AC driving processing A2 at the first and second frequencies of different values.

Moreover, in the example shown in FIG. 6B, the control unit 40 may perform control of supplying a third alternating current, which repeats a first polarity component and a second polarity component at a third frequency different from the first and second frequencies, as the driving current I in the third AC driving processing A3.

Figure 7A:
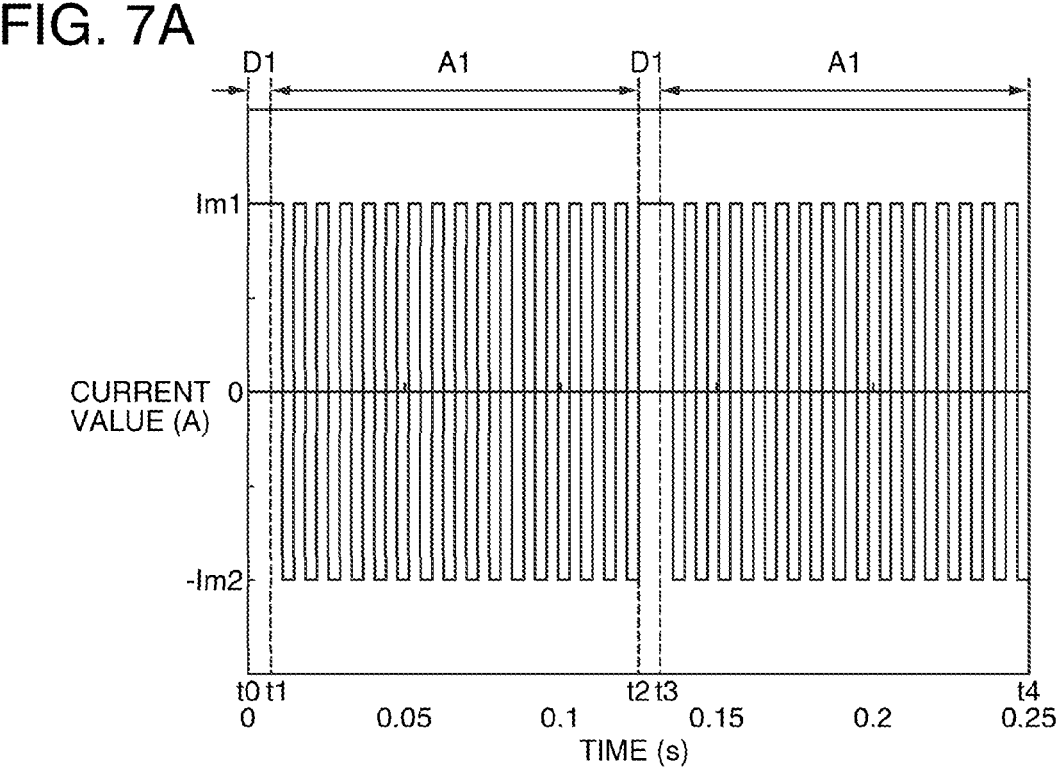
FIG. 7A is a timing chart illustrating an example of a waveform of a driving current in the first section.
Figure 7B:
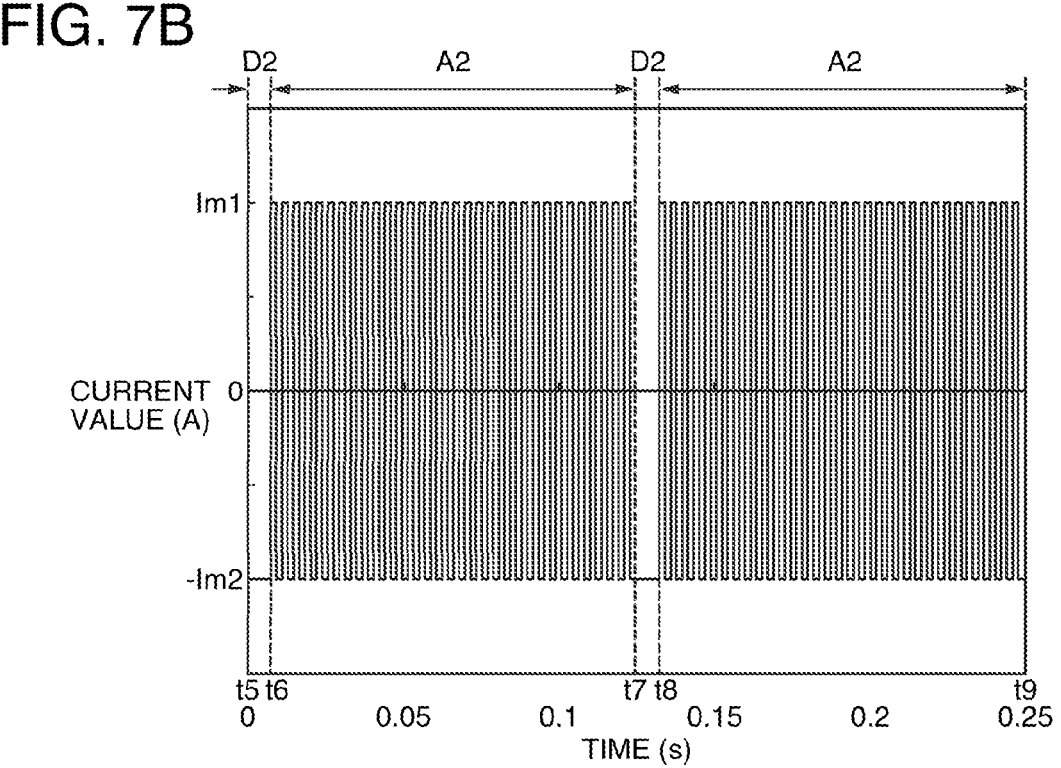
FIG. 7B is a timing chart illustrating an example of a waveform of the driving current in the second section.

FIG. 7A is a timing chart showing an example of a waveform of the driving current I in the first section, and FIG. 7B is a timing chart showing an example of a waveform of the driving current I in the second section. In FIGS. 7A and 7B, the horizontal axis indicates a time and the vertical axis indicates the current value of the driving current I. In FIGS. 7A and 7B, the driving current I with the first polarity is set to have a positive value, and the driving current I with the second polarity is set to have a negative value.

In the example shown in FIG. 7A, the control unit 40 performs the first DC driving processing D1 in a period from time t0 to time t1, the first AC driving processing A1 in a period from time t1 to time t2, the first DC driving processing D1 in a period from time t2 to time t3, and the first AC driving processing A1 in a period from time t3 to time t4.

In the example shown in FIG. 7A, the control unit 40 performs control of supplying the driving current I, which holds the same polarity (first polarity) for a period longer than a ½ period of the driving current I in the first AC driving processing A1, in the first DC driving processing D1.

In addition, in the example shown in FIG. 7A, the control unit 40 performs control of supplying the driving current I, which is a rectangular wave alternating current starting from a phase of the same polarity (first polarity) as in the last first DC driving processing D1, in the first AC driving processing A1.

In the example shown in FIG. 7B, the control unit 40 performs the second DC driving processing D2 in a period from time t5 to time t6, the second AC driving processing A2 in a period from time t6 to time t7, the second DC driving processing D2 in a period from time t7 to time t8, and the second AC driving processing A2 in a period from time t8 to time t9.

In the example shown in FIG. 7B, the control unit 40 performs control of supplying the driving current I, which holds the same polarity (second polarity) for a period longer than a ½ period of the driving current I in the second AC driving processing A2, in the second DC driving processing D2.

Moreover, in the example shown in FIG. 7B, similar to the first AC driving processing A1, the control unit 40 performs control of supplying the driving current I, which is a rectangular wave alternating current starting from a phase of the same polarity (first polarity) as in the first DC driving processing D1, in the second AC driving processing A2.

Since a current flows with the same polarity in a period for which the driving current I is a direct current, the arc spot becomes large. Accordingly, an electrode tip portion including an unnecessary projection and the like can be melted smoothly. Since a current which repeats the first and second polarities alternately flows in a period for which the driving current I is an alternating current, the arc spot becomes small. Accordingly, the growth of a projection of an electrode tip portion needed as a discharge origin can be promoted.

Accordingly, by alternately repeating a period for which the driving current I is a direct current and a period for which the driving current I is an alternating current by appropriately setting the driving conditions (for example, a frequency in a period for which the driving current I is an alternating current, the length of a period for which the driving current I is a direct current, and the length of a period for which the driving current I is an alternating current), the electrode shape is satisfactorily maintained. As a result, the discharge lamp 90 can be stably lit.

However, when the thermal conditions of the first and second electrodes of the discharge lamp 90 are different, a driving condition suitable for the first electrode and a driving condition suitable for the second electrode may be different.

Accordingly, in the example shown in FIGS. 7A and 7B, the control unit 40 performs the first AC driving processing A1 and the second AC driving processing A2 at the first and second frequencies of different values.

According to the discharge lamp lighting device 10 of the first embodiment, the first AC driving processing A1 and the second AC driving processing A2 are performed at the first and second frequencies of different values. As a result, since the deformation of the electrode of the discharge lamp 90 is suppressed, it is possible to select a more suitable driving condition according to the thermal condition of each electrode provided in the discharge lamp 90.

For example, in the case where the main reflecting mirror 112, which reflects a light beam generated by discharge between the first and second electrodes 92 and 93 so that the light beam is emitted to an illuminated region, is disposed at the first electrode 92 side and the auxiliary reflecting mirror 50, which reflects a light beam from an interelectrode space between the first and second electrodes 92 and 93 toward the interelectrode space side, is disposed at the second electrode 93 side so as to face the main reflecting mirror 112 like the discharge lamp 90 described using FIG. 2, the thermal conditions are set in which the temperature of the second electrode 93 is likely to rise compared with that of the first electrode 92 due to the influence of light (returning light) reflected by the auxiliary reflecting mirror 50.

In such a case, for example, if the discharge lamp 90 keeps lighting under the driving condition suitable for the first electrode 92, a tip portion of the second electrode 93 may melt excessively. As a result, a projection of an electrode tip portion necessary as a discharge origin may disappear. Moreover, for example, if the discharge lamp 90 keeps lighting under the driving condition suitable for the second electrode 93, the first electrode 92 may not melt sufficiently. As a result, it becomes difficult to maintain the electrode shape.

In such a case, as shown in FIGS. 7A and 7B, the control unit 40 may perform the first AC driving processing A1 and the second AC driving processing A2 such that the second frequency becomes higher than the first frequency.

Generally, since an arc spot in which an electrode melts becomes narrow as a frequency of the driving current I increases, loss of a projection caused by excessive melting can be suppressed. Accordingly, by performing the first AC driving processing A1 and the second AC driving processing A2 such that the second frequency becomes higher than the first frequency, it is possible to suppress the loss of a projection of an electrode tip portion serving as an arc origin, which is caused by excessive melting, in the second electrode 93 the temperature of which is likely to rise.

In the discharge lamp lighting device 10 according to the first embodiment, the control unit 40 may perform the first AC driving processing A1 and the second AC driving processing A2 such that the length of a period, for which the first AC driving processing A1 is performed, in the first section is different from the length of a period, for which the second AC driving processing A2 is performed, in the second section.

The temperature of the first electrode 92 rises in a period for which the driving current I is the first direct current, and the temperature of the second electrode 93 rises in a period for which the driving current I is the second direct current. Accordingly, by performing the first AC driving processing A1 and the second AC driving processing A2 such that the length of a period, for which the first AC driving processing A1 is performed, in the first section is different from the length of a period, for which the second AC driving processing A2 is performed, in the second section, the frequency of the first DC driving processing D1 in which the temperature of the first electrode 92 rises and the frequency of the second DC driving processing D2 in which the temperature of the second electrode 93 rises can be selected according to the thermal condition of each electrode. As a result, a more suitable driving condition can be selected in order to suppress the deformation of an electrode of the discharge lamp 90.

For example, when the thermal conditions in which the temperature of the second electrode 93 is likely to rise compared with that of the first electrode 92 are set like the discharge lamp 90 described using FIG. 2, the control unit 40 performs the first AC driving processing A1 and the second AC driving processing A2 such that the length of the period, for which the second AC driving processing A2 is performed, in the second section becomes longer than the length of the period, for which the first AC driving processing A1 is performed, in the first section. In this case, since the frequency of the second DC driving processing D2 in the second section is decreased, it is possible to suppress the loss of a projection of an electrode tip portion serving as an arc origin, which is caused by excessive melting, in the second electrode 93 the temperature of which is likely to rise.

In the discharge lamp lighting device 10 according to the first embodiment, the control unit 40 may perform the first DC driving processing D1 and the second DC driving processing D2 such that the length of a period, for which the first DC driving processing D1 is performed, in the first section is different from the length of a period, for which the second DC driving processing D2 is performed, in the second section.

The temperature of the first electrode 92 rises as the period, for which the driving current I is the first direct current, increases, and the temperature of the second electrode 93 rises as the period, for which the driving current I is the second direct current, increases. Accordingly, by performing the first DC driving processing D1 and the second DC driving processing D2 such that the length of the period, for which the first DC driving processing D1 is performed, in the first section is different from the length of the period, for which the second DC driving processing D2 is performed, in the second section, the length of the period of the first DC driving processing D1 in which the temperature of the first electrode 92 rises and the length of the period of the second DC driving processing D2 in which the temperature of the second electrode 93 rises can be selected according to the thermal condition of each electrode. As a result, a more suitable driving condition can be selected in order to suppress the deformation of the electrode of the discharge lamp 90.

For example, when the thermal conditions in which the temperature of the second electrode 93 is likely to rise compared with that of the first electrode 92 are set like the discharge lamp 90 described using FIG. 2, the control unit 40 performs the first DC driving processing D1 and the second DC driving processing D2 such that the length of the period, for which the second DC driving processing D2 is performed, in the second section becomes shorter than the length of the period, for which the first DC driving processing D1 is performed, in the first section. In this case, since a temperature increase of the second electrode 93 caused by one-time second DC driving processing D2 is small, it is possible to suppress the loss of a projection of an electrode tip portion serving as an arc origin, which is caused by excessive melting, in the second electrode 93 the temperature of which is likely to rise.

3. Discharge Lamp Lighting Device According to a Second Embodiment

In the first embodiment, an example has been described in which the control unit 40 performs the first AC driving processing A1 at the fixed first frequency and performs the second AC driving processing A2 at the fixed second frequency. However, the control unit 40 may perform the first AC driving processing A1 and the second AC driving processing A2 by changing the first frequency in a first modulation pattern and changing the second frequency in a second modulation pattern different from the first modulation pattern.

Figure 8A:
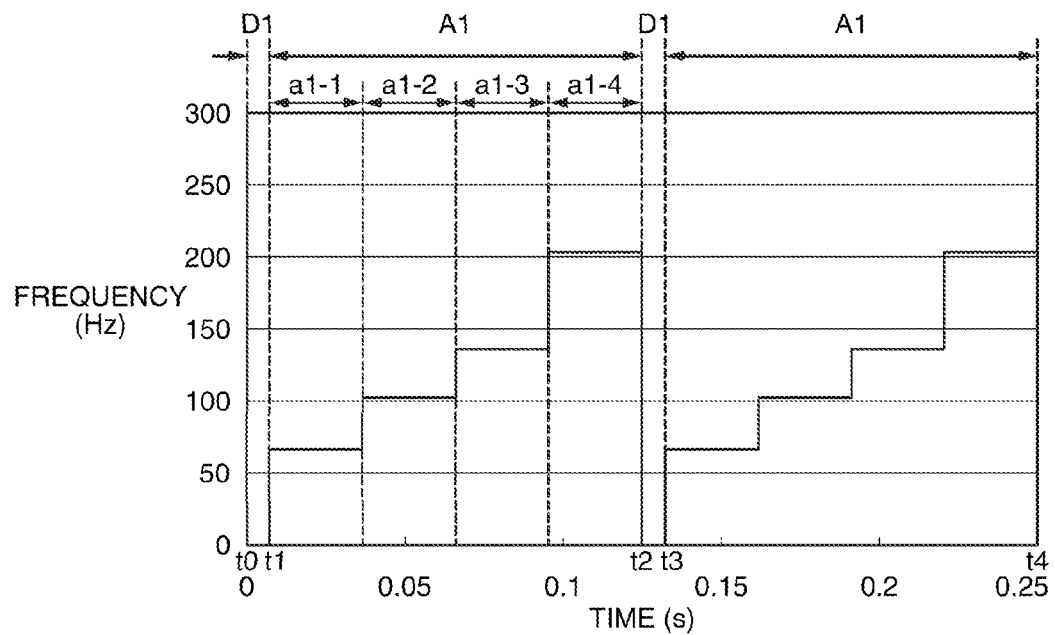
FIGS. 8A and 8B are timing charts for explaining examples of first and second modulation patterns.
Figure 8B:
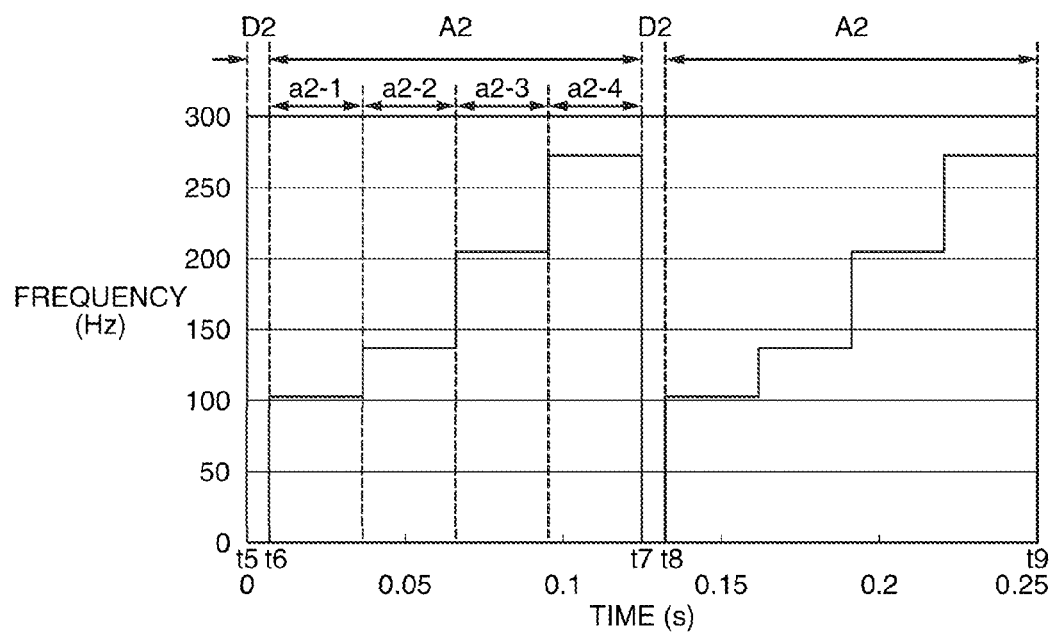

FIGS. 8A and 8B are timing charts for explaining examples of the first and second modulation patterns. The vertical axis in FIG. 8A indicates the first frequency in the first modulation pattern, and the vertical axis in FIG. 8B indicates the second frequency in the second modulation pattern. In FIGS. 8A and 8B, the horizontal axis indicates a time. Moreover, when the driving current I is a direct current, the frequency is expressed as 0 Hz.

In the example shown in FIG. 8A, the first modulation pattern is a modulation pattern which includes periods a1-1, a1-2, a1-3, and a1-4, in each of which the first frequency is a fixed value, and in which the frequency increases in a stepwise manner. In the example shown in FIG. 8B, the second modulation pattern is a modulation pattern which includes periods a2-1, a2-2, a2-3, and a2-4, in each of which the second frequency is a fixed value, and in which the frequency increases in a stepwise manner. If the driving current I is supplied to the discharge lamp 90 in a modulation pattern, in which the frequency increases in a stepwise manner, after supplying to the discharge lamp 90 the driving current I which is a direct current, the arc spot becomes narrow in a stepwise manner. Accordingly, it is possible to make a base portion of a projection of an electrode tip portion thick and to make a tip portion of the projection thin. As a result, the shape of the projection of the electrode tip portion which becomes an arc origin can be maintained satisfactorily.

However, when the thermal conditions of the first and second electrodes are different, a modulation pattern suitable for the first electrode and a modulation pattern suitable for the second electrode may be different.

Accordingly, in the examples shown in FIGS. 8A and 8B, the second frequency in each of the periods a2-1, a2-2, a2-3, and a2-4 is different from the first frequency in each of the periods a1-1, a1-2, a1-3, and a1-4. That is, the first and second modulation patterns are different modulation patterns.

According to the discharge lamp lighting device 10 of the second embodiment, the first AC driving processing A1 and the second AC driving processing A2 are performed by changing the first frequency in the first modulation pattern and changing the second frequency in the second modulation pattern different from the first modulation pattern. As a result, since the deformation of the electrode of the discharge lamp 90 is suppressed, it is possible to select a more suitable driving condition (modulation pattern) according to the thermal condition of each electrode provided in the discharge lamp 90.

For example, in the case where the main reflecting mirror 112, which reflects a light beam generated by discharge between the first and second electrodes 92 and 93 so that the light beam is emitted to an illuminated region, is disposed at the first electrode 92 side and the auxiliary reflecting mirror 50, which reflects a light beam from an interelectrode space between the first and second electrodes 92 and 93 toward the interelectrode space side, is disposed at the second electrode 93 side so as to face the main reflecting mirror 112 like the discharge lamp 90 described using FIG. 2, thermal conditions in which the temperature of the second electrode 93 is likely to rise compared with that of the first electrode 92 due to the influence of light (returning light) reflected by the auxiliary reflecting mirror 50.

In such a case, for example, if the discharge lamp 90 keeps lighting under the driving condition (modulation pattern) suitable for the first electrode 92, a tip portion of the second electrode 93 may melt excessively. As a result, a projection of an electrode tip portion necessary as a discharge origin may disappear. Moreover, for example, if the discharge lamp 90 keeps lighting under the driving condition (modulation pattern) suitable for the second electrode 93, the first electrode 92 may not melt sufficiently. As a result, it becomes difficult to maintain the electrode shape.

In such a case, as shown in FIGS. 8A and 8B, the control unit 40 may perform the first AC driving processing A1 and the second AC driving processing A2 such that the second frequency in the second modulation pattern becomes higher than the first frequency in the first modulation pattern.

In the examples shown in FIGS. 8A and 8B, modulation patterns are set in which the second frequency is higher than the first frequency at any time if the first frequency after a predetermined time has elapsed from time t1 is compared with the second frequency after the same predetermined time as that above has elapsed from time t6. In addition, for example, a modulation pattern may also be set in which the average second frequency in the period, for which the second AC driving processing A2 is performed, is higher than the average first frequency in the period, for which the first AC driving processing A1 is performed.

Generally, since an arc spot in which an electrode melts becomes narrow as a frequency of the driving current I increases, loss of a projection caused by excessive melting can be suppressed. Accordingly, by performing the first AC driving processing A1 and the second AC driving processing A2 such that the second frequency becomes higher than the first frequency, it is possible to suppress the loss of a projection of an electrode tip portion serving as an arc origin, which is caused by excessive melting, in the second electrode 93 the temperature of which is likely to rise.

First Modification

Figure 9A:
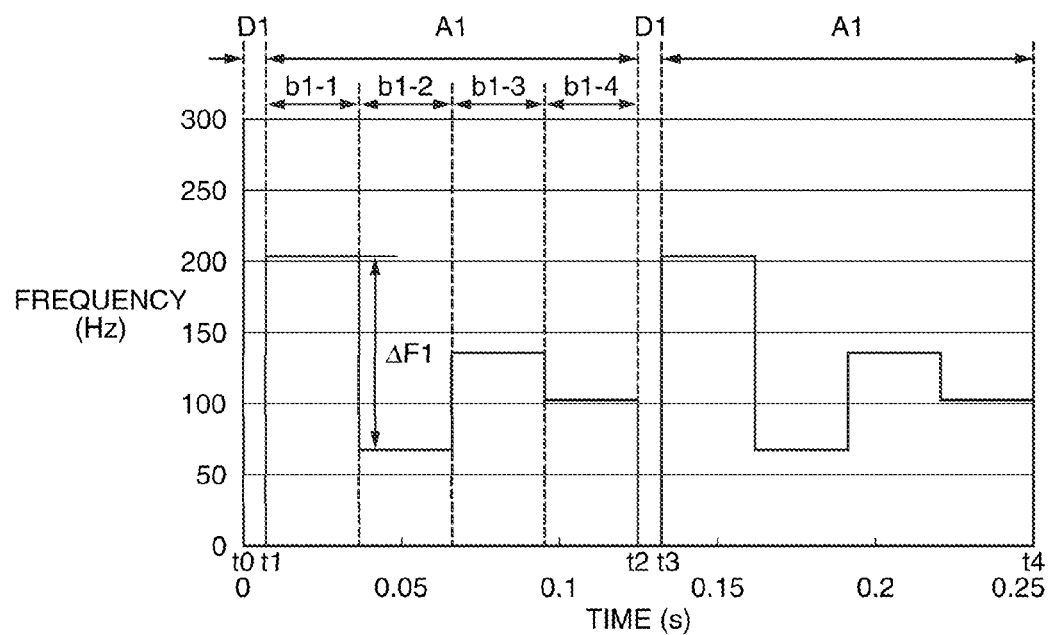
FIGS. 9A and 9B are timing charts for explaining other examples of the first and second modulation patterns.
Figure 9B:
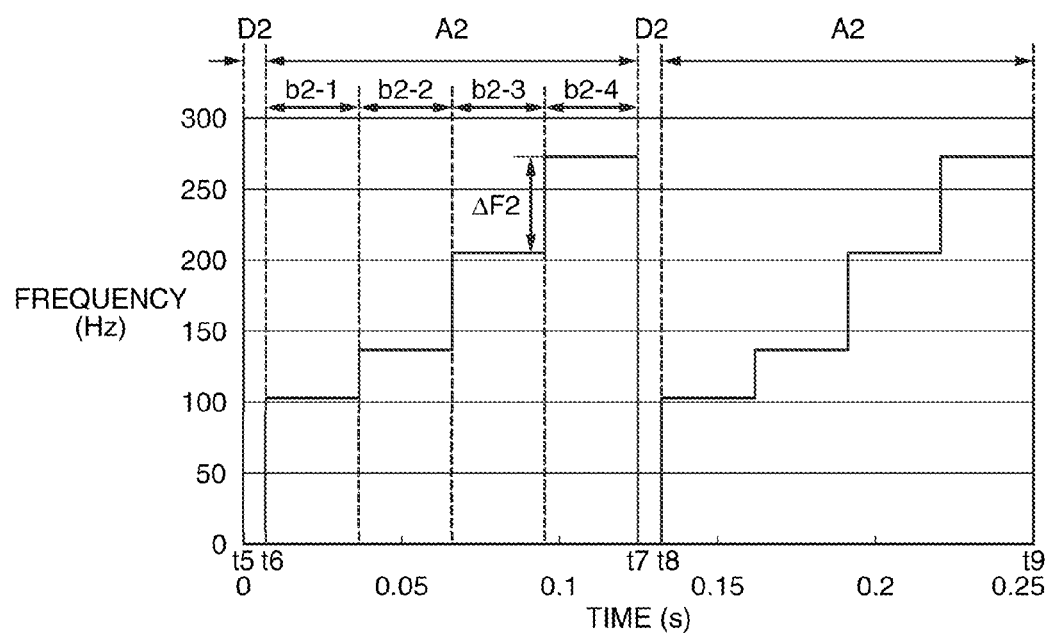

FIGS. 9A and 9B are timing charts for explaining other examples of the first and second modulation patterns. The vertical axis in FIG. 9A indicates the first frequency in the first modulation pattern, and the vertical axis in FIG. 9B indicates the second frequency in the second modulation pattern. In FIGS. 9A and 9B, the horizontal axis indicates a time. Moreover, when the driving current I is a direct current, the frequency is expressed as 0 Hz.

In the example shown in FIG. 9A, the first modulation pattern is a modulation pattern which includes periods b1-1, b1-2, b1-3, and b1-4, in each of which the first frequency is a fixed value, and in which a frequency-increasing change and a frequency-decreasing change are alternately repeated. In addition, the maximum value $\Delta F1$ of a temporal change of the first frequency in the first modulation pattern is between the periods b1-1 and b1-2.

In the example shown in FIG. 9B, the second modulation pattern is a modulation pattern which includes periods b2-1, b2-2, b2-3, and b2-4, in each of which the second frequency is a fixed value, and in which the frequency increases in a stepwise manner. In addition, the maximum value $\Delta F2$ of a temporal change of the second frequency in the second modulation pattern is between the periods b2-3 and b2-4.

A period for which the melting amount of an electrode is large and a period for which the melting amount of an electrode is small can be generated by increasing the variation of the frequency of the driving current I, and a projection of an electrode tip portion which becomes an arc origin can be grown by giving a stimulus to the electrode tip portion.

However, in the case where the thermal conditions are set in which the temperature of the second electrode 93 is likely to rise compared with that of the first electrode 92 like the discharge lamp 90 described using FIG. 2, for example, if the temporal change of the frequency of the driving current I is increased after the temperature of the second electrode 93 rises by supplying the second direct current to the discharge lamp 90 as the driving current I, an adverse effect, such as blackening, may occur due to excessive evaporation, scattering, or the like of an electrode material of the second electrode 93.

In such a case, as shown in FIGS. 9A and 9B, the control unit 40 may perform the first AC driving processing A1 and the second AC driving processing A2 such that the maximum value $\Delta F2$ of a temporal change of the second frequency in the second modulation pattern becomes smaller than the maximum value $\Delta F1$ of a temporal change of the first frequency in the first modulation pattern. As a result, it is possible to suppress problems, such as blackening, caused by excessive evaporation, scattering, or the like of an electrode material which easily occurs in the second electrode, the temperature of which is likely to rise.

Second Modification

In the discharge lamp lighting device 10 of the second embodiment and the first modification, the control unit 40 may perform the first AC driving processing A1 and the second AC driving processing A2 such that the length of a period, for which the first AC driving processing A1 is performed, in the first section is different from the length of a period, for which the second AC driving processing A2 is performed, in the second section.

The temperature of the first electrode 92 rises in a period for which the driving current I is the first direct current, and the temperature of the second electrode 93 rises in a period for which the driving current I is the second direct current. Accordingly, by performing the first AC driving processing A1 and the second AC driving processing A2 such that the length of a period, for which the first AC driving processing A1 is performed, in the first section is different from the length of a period, for which the second AC driving processing A2 is performed, in the second section, the frequency of the first DC driving processing D1 in which the temperature of the first electrode 92 rises and the frequency of the second DC driving processing D2 in which the temperature of the second electrode 93 rises can be selected according to the thermal condition of each electrode. As a result, a more suitable driving condition can be selected in order to suppress the deformation of the electrode of the discharge lamp 90.

For example, when the thermal conditions in which the temperature of the second electrode 93 is likely to rise compared with that of the first electrode 92 are set like the discharge lamp 90 described using FIG. 2, the control unit 40 performs the first AC driving processing A1 and the second AC driving processing A2 such that the length of the period, for which the second AC driving processing A2 is performed, in the second section becomes longer than the length of the period, for which the first AC driving processing A1 is performed, in the first section. In this case, since the frequency of the second DC driving processing D2 in the second section is decreased, it is possible to suppress the loss of a projection of an electrode tip portion serving as an arc origin, which is caused by excessive melting, in the second electrode 93 the temperature of which is likely to rise.

In the discharge lamp lighting device 10 of the second embodiment and the first modification, the control unit 40 may perform the first DC driving processing D1 and the second DC driving processing D2 such that the length of a period, for which the first DC driving processing D1 is performed, in the first section is different from the length of a period, for which the second DC driving processing D2 is performed, in the second section.

The temperature of the first electrode 92 rises as the period, for which the driving current I is the first direct current, increases, and the temperature of the second electrode 93 rises as the period, for which the driving current I is the second direct current, increases. Accordingly, by performing the first DC driving processing D1 and the second DC driving processing D2 such that the length of the period, for which the first DC driving processing D1 is performed, in the first section is different from the length of the period, for which the second DC driving processing D2 is performed, in the second section, the length of the period of the first DC driving processing D1 in which the temperature of the first electrode 92 rises and the length of the period of the second DC driving processing D2 in which the temperature of the second electrode 93 rises can be selected according to the thermal condition of each electrode. As a result, a more suitable driving condition can be selected in order to suppress the deformation of the electrode of the discharge lamp 90.

For example, when the thermal conditions in which the temperature of the second electrode 93 is likely to rise compared with that of the first electrode 92 are set like the discharge lamp 90 described using FIG. 2, the control unit 40 performs the first DC driving processing D1 and the second DC driving processing D2 such that the length of the period, for which the second DC driving processing D2 is performed, in the second section becomes shorter than the length of the period, for which the first DC driving processing D1 is performed, in the first section. In this case, since a temperature increase of the second electrode 93 caused by one-time second DC driving processing D2 is small, it is possible to suppress the loss of a projection of an electrode tip portion serving as an arc origin, which is caused by excessive melting, in the second electrode 93 the temperature of which is likely to rise.

4. Circuit Configuration of a Projector

Figure 10:
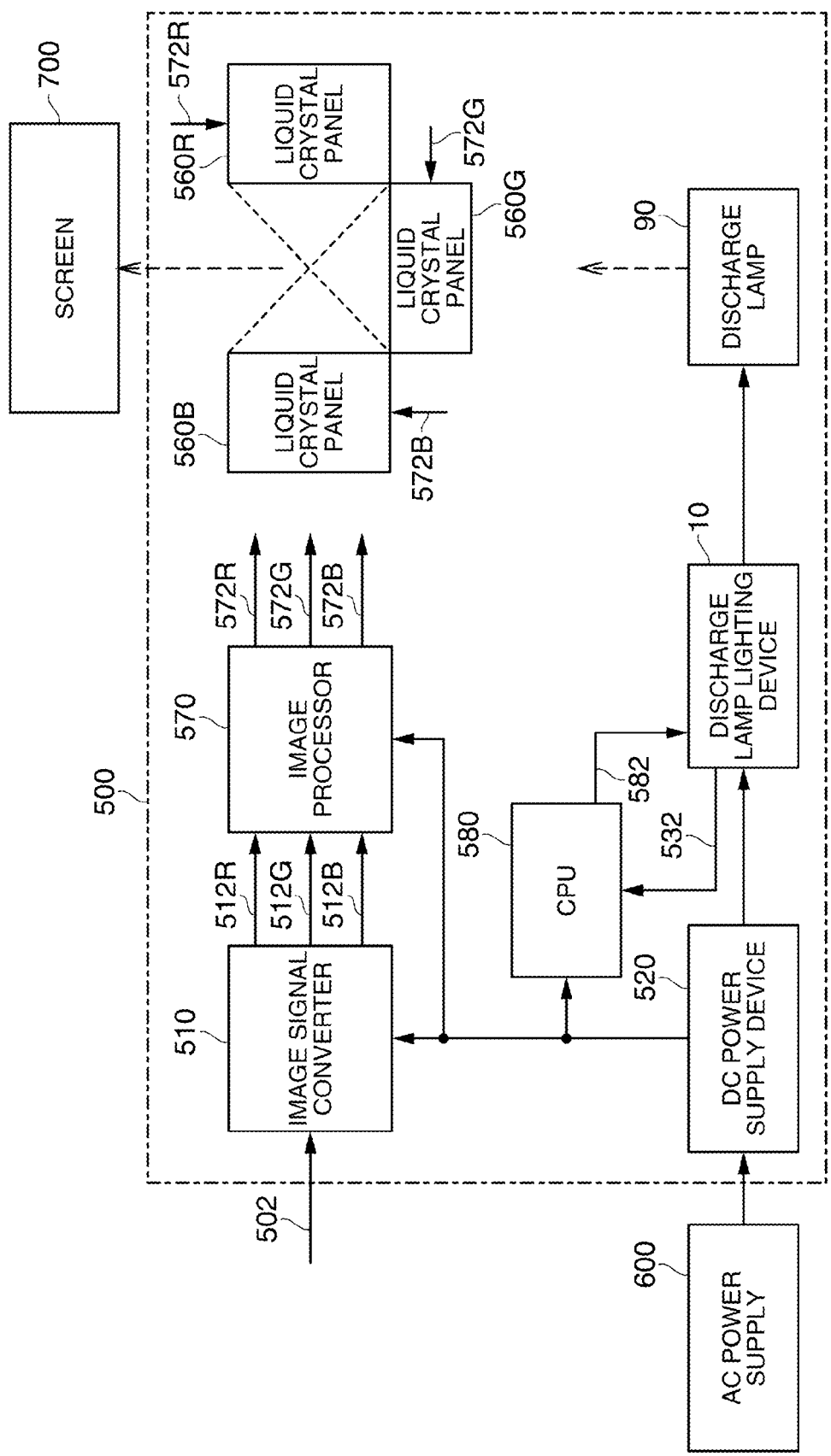
FIG. 10 is a view illustrating an example of the circuit configuration of a projector according to an embodiment.

FIG. 10 is a view showing an example of the circuit configuration of the projector according to the present embodiment. The projector 500 includes not only the above-described optical system but also an image signal converter 510, a DC power supply device 520, the discharge lamp lighting device 10, the discharge lamp 90, the liquid crystal panels 560R, 560G, and 560B, and an image processor 570.

The image signal converter 510 generates image signals 512R, 512G, and 512B by converting an image signal 502 (for example, a brightness signal and a color difference signal or an analog RGB signal), which is input from the outside, into a digital RGB signal with a predetermined word length and then supplies the image signals 512R, 512G, and 512B to the image processor 570.

The image processor 570 performs image processing on the three image signals 512R, 512G, and 512B and outputs driving signals 572R, 572G, and 572B for driving the liquid crystal panels 560R, 560G, and 560B, respectively.

The DC power supply device 520 converts the AC voltage supplied from an external AC power supply 600 into the fixed DC voltage and then supplies the DC voltage to the image signal converter 510 located at the secondary side of a transformer (not shown but included in the DC power supply device 520), the image processor 570, and the discharge lamp lighting device 10 located at the primary side of the transformer.

At the start of the discharge lamp lighting device 10, the discharge lamp lighting device 10 generates a high voltage between electrodes of the discharge lamp 90 so that a discharge path is formed by dielectric breakdown. Then, the discharge lamp lighting device 10 supplies a driving current I for making the discharge lamp 90 keep the discharge.

The liquid crystal panels 560R, 560G, and 560B modulate the brightness of color light, which is incident on each liquid crystal panel through the optical system described previously, by the driving signals 572R, 572G, and 572B, respectively.

A CPU (Central Processing Unit) 580 controls an operation until the projector is turned off after the start of lighting in the projector. For example, a lighting command or a lights-out command may be output to the discharge lamp lighting device 10 through a communication signal 582. In addition, the CPU 580 may receive lighting information on the discharge lamp 90 from the discharge lamp lighting device 10 through a communication signal 532.

In the projector 500 configured as described above, in order to suppress the deformation of the electrode of the discharge lamp 90, it is possible to select a more suitable driving condition according to the thermal condition of each electrode provided in the discharge lamp 90.

In each of the above embodiments, the projector which uses three liquid crystal panels has been illustrated. However, the disclosure is not limited thereto and may also be applied to a projector which uses one, two, or four or more liquid crystal panels.

In each of the above embodiments, the transmissive projector has been illustrated. However, the disclosure is not limited thereto and may also be applied to a reflective projector. Here, 'transmissive' means that an electro-optical modulator as a light modulation unit is of a type in which light is transmitted therethrough like a transmissive liquid crystal panel, and 'reflective' means that an electro-optical modulator as a light modulation unit is of a type in which light is reflected therefrom like a reflective liquid crystal panel or a micromirror type modulator. As the micromirror type modulator, a DMD (digital micromirror device; trademark of Texas Instruments) may be used, for example. Also when the disclosure is applied to the reflective projector, the same effects as in the transmissive projector can be acquired.

The disclosure may be applied to both a front projection type projector, which projects a projected image from the observation side, and a rear projection type projector, which projects a projected image from the opposite side to the observation side.

In addition, the disclosure is not limited to the above-described embodiments, and various modifications may be made within the scope and spirit of the disclosure.

The disclosure includes substantially the same configuration (for example, a configuration with the same function, method, and result or a configuration with the same object and effect) as the configuration described in the embodiment. In addition, the disclosure includes a configuration which replaces a portion that is not essential in the configuration described in the embodiment. In addition, the disclosure includes a configuration capable of achieving the same operation and effect as in the configuration described in the embodiment or a configuration capable of achieving the same object. In addition, the disclosure includes a configuration in which a known technique is added to the configuration described in the embodiment.

For example, in the above embodiments, the alternating current (rectangular wave alternating current) which alternately repeats a period, for which a predetermined current value of the first polarity continues, and a period, for which a predetermined current value of the second polarity continues, has been described as an example of the alternating current supplied as the driving current I. However, the alternating current supplied as the driving current I may also be an alternating current whose current value changes during a period for which the first polarity or the second polarity continues.

Moreover, although an example of the modulation pattern in which a frequency changes in four steps has been described in the above embodiments, it is also possible to use a modulation pattern in which a frequency changes in three or less steps, a modulation pattern in which a frequency changes in five or more steps, and a modulation pattern in which a frequency changes continuously. In addition, the time of a step or the number of steps which changes between the first and second modulation patterns may be different. Therefore, it is manifestly intended that embodiments in accordance with the present disclosure be limited only by the claims and the equivalents thereof.

What is claimed is:

1. A discharge lamp lighting device comprising:
    a discharge lamp driving section that supplies a driving current to drive a discharge lamp having a first and a second electrode, each electrode having different thermal conditions, the driving current including components of a first polarity and a component of a second polarity opposite to the first polarity; and
    a control unit that controls the discharge lamp driving section, the control unit configured to
    alternately perform a first DC driving processing and a first AC driving processing in a first section of the driving current;
    alternately perform a second DC driving processing and a second AC driving processing in a second section of the driving current different from the first section;
    perform control of supplying a first direct current as the driving current in the first DC driving processing, the first direct current starting from the first polarity and having a component of the first polarity;
    perform control of supplying a first alternating current as the driving current in the first AC driving processing, the first alternating current repeating a component of the first polarity and a component of the second polarity at a first frequency;
    perform control of supplying a second direct current as the driving current in the second DC driving processing, the second direct current starting from the second polarity and having a component of the second polarity;
    perform control of supplying a second alternating current as the driving current in the second AC driving processing, the second alternating current repeating a component of the first polarity and a component of the second polarity at a second frequency; and
    perform the first AC driving processing and the second AC driving processing such that the first frequency and the second frequency have different values,
    wherein a period of the first direct current is longer than half of a period of the first alternating current, and a period of the second direct current is longer than half of a period of the second alternating current.

2. The discharge lamp lighting device according to claim 1, wherein the first electrode operates as an anode at a time of the first polarity and the second electrode operates as an anode at a time of the second polarity at thermal conditions where a temperature of the second electrode is likely to rise as compared with that of the first electrode.

3. The discharge lamp lighting device according to claim 2, wherein the control unit performs the first AC driving processing and the second AC driving processing such that the second frequency is higher than the first frequency.

4. The discharge lamp lighting device according to claim 2, configured to drive the discharge lamp in which a main reflecting mirror is disposed at a side of the first electrode, the main reflecting mirror reflecting a light beam generated by a discharge between the first and second electrodes so that the light beam is emitted to an illuminated region, and an auxiliary reflecting mirror is disposed at a side of the second electrode so as to face the main reflecting mirror, the auxiliary reflecting mirror reflecting a light beam from an interelectrode space between the first and second electrodes toward a side of the interelectrode space.

5. The discharge lamp lighting device according to claim 1, wherein the control unit performs the first AC driving processing and the second AC driving processing such that a length of a period in the first section for the first AC driving processing is different from a length of a period in the second section for the second AC driving processing.

6. The discharge lamp lighting device according to claim 1, wherein the control unit performs the first DC driving processing and the second DC driving processing such that a length of a period in the first section for the first DC driving processing is different from a length of a period in the second section for the second DC driving processing.

7. A projector comprising the discharge lamp lighting device according to claim 1.

8. A discharge lamp lighting device comprising:
a discharge lamp driving section that supplies a driving current to drive a discharge lamp having a first and second electrode, each electrode having different thermal conditions, the driving current including components of a first polarity and a component of a second polarity opposite to the first polarity; and
a control unit that controls the discharge lamp driving section, the control unit configured to
alternately perform a first DC driving processing and a first AC driving processing in a first section of the driving current;
alternately perform a second DC driving processing and a second AC driving processing in a second section of the driving current different from the first section;
perform control of supplying a first direct current as the driving current in the first DC driving processing, the first direct current starting from the first polarity and having a component of the first polarity;
perform control of supplying a first alternating current as the driving current in the first AC driving processing, the first alternating current repeating a component of the first polarity and a component of the second polarity at a first frequency;
perform control of supplying a second direct current as the driving current in the second DC driving processing, the second direct current starting from the second polarity and having a component of the second polarity;
perform control of supplying a second alternating current as the driving current in the second AC driving processing, the second alternating current repeating a component of the first polarity and a component of the second polarity at a second frequency; and
perform the first AC driving processing and the second AC driving processing by changing the first frequency in a first modulation pattern and changing the second frequency in a second modulation pattern different from the first modulation pattern,
wherein the second frequency in the second modulation pattern at a predetermined time is higher than the first frequency in the first modulation pattern as measured using the same predetermined time.

9. The discharge lamp lighting device according to claim 8, wherein the first electrode operates as an anode at a time of the first polarity and the second electrode operates as an anode at a time of the second polarity at thermal conditions where a temperature of the second electrode is likely to rise as compared with that of the first electrode.

10. The discharge lamp lighting device according to claim 9, wherein the control unit performs the first AC driving processing and the second AC driving processing such that a maximum value of a temporal change of the second frequency in a second modulation pattern is smaller than a maximum value of a temporal change of the first frequency in a first modulation pattern.

11. The discharge lamp lighting device according to claim 9, wherein the control unit performs the first AC driving processing and the second AC driving processing such that the second frequency is higher than the first frequency.

12. The discharge lamp lighting device according to claim 9, configured to drive the discharge lamp in which a main reflecting mirror is disposed at a side of the first electrode, the main reflecting mirror reflecting a light beam generated by a discharge between the first and second electrodes so that the light beam is emitted to an illuminated region, and an auxiliary reflecting mirror is disposed at a side of the second electrode so as to face the main reflecting mirror, the auxiliary reflecting mirror reflecting a light beam from an interelectrode space between the first and second electrodes toward a side of the interelectrode space.

13. The discharge lamp lighting device according to claim 8, wherein the control unit performs the first AC driving processing and the second AC driving processing such that a length of a period in the first section for the first AC driving processing is different from a length of a period in the second section for the second AC driving processing.

14. The discharge lamp lighting device according to claim 8, wherein the control unit performs the first DC driving processing and the second DC driving processing such that a length of a period in the first section for the first DC driving processing is different from a length of a period in the second section for the second DC driving processing.

15. The discharge lamp lighting device according to claim 8, wherein an average frequency in the second modulation pattern is higher than an average frequency in the first modulation pattern.

16. A projector comprising the discharge lamp lighting device according to claim 8.

17. A driving method for supplying a driving current to a discharge lamp having a pair of electrodes with different thermal conditions, comprising:
performing a first DC driving and a first AC driving alternately in a first portion of the driving current;
performing a second DC driving and a second AC driving alternately in a second portion of the driving current different from the first portion;
supplying a first direct current as the driving current in the first DC driving, the first direct current starting from a first polarity and having a first polarity component;
supplying a first alternating current as the driving current in the first AC driving, the first alternating current repeating a first polarity component and a second polarity component at a first frequency;
supplying a second direct current as the driving current in the second DC driving, the second direct current starting from a second polarity and having a second polarity component;
supplying a second alternating current as the driving current in the second AC driving, the second alternating current repeating a first polarity component and a second polarity component at a second frequency; and
performing the first AC driving and the second AC driving such that the first frequency and the second frequency have different values,
wherein a period of the first direct current is longer than half of a period of the first alternating current, and a period of the second direct current is longer than half of a period of the second alternating current.

18. A driving method for supplying a driving current to a discharge lamp having a pair of electrodes with different thermal conditions, comprising:
performing a first DC driving and a first AC driving alternately in a first portion of the driving current;
performing a second DC driving and a second AC driving alternately in a second portion of the driving current different from the first portion;

supplying a first direct current as the driving current in the first DC driving, the first direct current starting from a first polarity and having a first polarity component;

supplying a first alternating current as the driving current in the first AC driving, the first alternating current repeating a first polarity component and a second polarity component at a first frequency;

supplying a second direct current as the driving current in the second DC driving, the second direct current starting from a second polarity and having a second polarity component;

supplying a second alternating current as the driving current in the second AC driving, the second alternating current repeating a first polarity component and a second polarity component at a second frequency; and performing the first AC driving and the second AC driving by changing the first frequency in a first modulation pattern and changing the second frequency in a second modulation pattern different from the first modulation pattern, wherein the second frequency in the second modulation pattern at a predetermined time is higher than the first frequency in the first modulation pattern as measured using the same predetermined time.

* * * * *